United States Patent
Urabayashi et al.

(10) Patent No.: US 9,843,427 B2
(45) Date of Patent: Dec. 12, 2017

(54) BASE STATION, PROCESSOR, COMMUNICATION CONTROL METHOD AND USER TERMINAL

(71) Applicant: KYOCERA CORPORATION, Kyoto (JP)

(72) Inventors: Hiroyuki Urabayashi, Yokohama (JP); Naohisa Matsumoto, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 126 days.

(21) Appl. No.: 14/647,810

(22) PCT Filed: Nov. 11, 2013

(86) PCT No.: PCT/JP2013/080397
§ 371 (c)(1),
(2) Date: May 27, 2015

(87) PCT Pub. No.: WO2014/084029
PCT Pub. Date: Jun. 5, 2014

(65) Prior Publication Data
US 2015/0312010 A1    Oct. 29, 2015

Related U.S. Application Data

(60) Provisional application No. 61/730,629, filed on Nov. 28, 2012, provisional application No. 61/730,635, filed on Nov. 28, 2012.

(51) Int. Cl.
*H04L 5/00* (2006.01)
*H04W 48/12* (2009.01)
(Continued)

(52) U.S. Cl.
CPC ............ *H04L 5/005* (2013.01); *H04L 1/0035* (2013.01); *H04L 1/0693* (2013.01);
(Continued)

(58) Field of Classification Search
CPC ..... H04L 5/005; H04L 1/0035; H04L 1/0693; H04L 5/0085; H04L 5/0023; H04W 48/12; H04W 72/042
See application file for complete search history.

(56) References Cited

U.S. PATENT DOCUMENTS

| 8,249,044 B2 | 8/2012 | Onodera et al. |
| 8,767,610 B2 * | 7/2014 | Kim ................ H04B 7/0413 370/315 |

(Continued)

FOREIGN PATENT DOCUMENTS

| JP | 2010-236866 A | 10/2010 |
| JP | 2010-283892 A | 12/2010 |

(Continued)

OTHER PUBLICATIONS

International Search Report; PCT/JP2013/080397; dated Feb. 4, 2014.
(Continued)

*Primary Examiner* — Hong Cho
(74) *Attorney, Agent, or Firm* — Studebaker & Brackett PC

(57) ABSTRACT

A base station that communicates with a plurality of user terminals in a mobile communication system in which a radio signal including a reference signal for estimating a channel characteristic is transmitted and received, comprises: a control unit that changes a reference signal density that is a density of the reference signal applied to communication with the plurality of user terminals. The control unit calculates a statistics amount of communication quality information acquired for all the plurality of user terminals, and changes the reference signal density on the basis of the statistics amount.

24 Claims, 18 Drawing Sheets

(51) Int. Cl.
 H04L 1/06 (2006.01)
 H04W 72/04 (2009.01)
 H04L 1/00 (2006.01)

(52) U.S. Cl.
 CPC .......... H04L 5/0085 (2013.01); H04W 48/12 (2013.01); H04W 72/042 (2013.01); H04L 1/0026 (2013.01); H04L 5/0023 (2013.01)

(56) References Cited

U.S. PATENT DOCUMENTS

| | | | |
|---|---|---|---|
| 8,942,081 B2* | 1/2015 | Kang | H04W 72/042 370/208 |
| 2009/0052342 A1 | 2/2009 | Onodera et al. | |
| 2009/0201872 A1* | 8/2009 | Gorokhov | H04L 5/006 370/329 |
| 2010/0080154 A1* | 4/2010 | Noh | H04B 7/0452 370/310 |
| 2010/0246527 A1* | 9/2010 | Montojo | H04L 25/0226 370/330 |
| 2011/0275396 A1* | 11/2011 | Nishio | H04B 7/0615 455/509 |
| 2012/0015601 A1 | 1/2012 | Tsutsui | |
| 2012/0113930 A1 | 5/2012 | Kuroda et al. | |
| 2013/0022096 A1* | 1/2013 | Kazmi | H04L 27/2602 375/224 |
| 2013/0215816 A1 | 8/2013 | Kuroda et al. | |
| 2015/0131472 A1* | 5/2015 | Nishio | H04B 7/0615 370/252 |

FOREIGN PATENT DOCUMENTS

| | | |
|---|---|---|
| JP | 2012-023598 A | 2/2012 |
| JP | 2012-199987 A | 10/2012 |
| WO | 2010/087176 A1 | 8/2010 |

OTHER PUBLICATIONS

Written Opinion of the International Searching Authority; PCT/JP2013/080397; dated Feb. 4, 2014.

3GPP TSG RAN WG1 Meeting #68bis; Renesas Mobile Europe Ltd; On Timing Tracking of Unsynchronized New Carrier Type; Jeju, Korea; Mar. 26-30, 2012; R1-121382; pp. 1-3.

* cited by examiner

FIG. 20
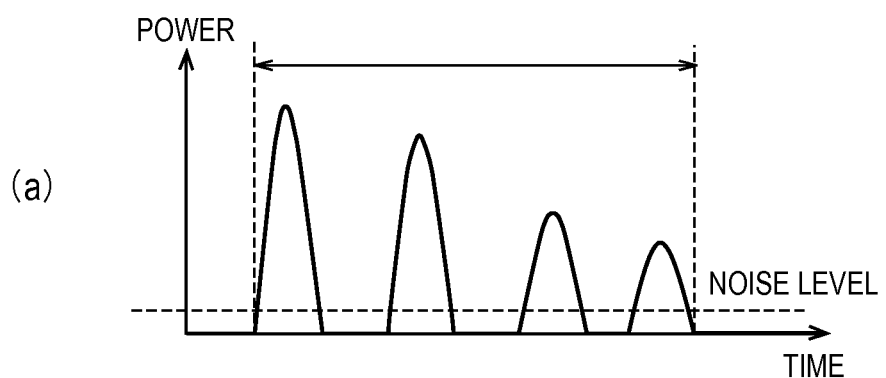
(a)
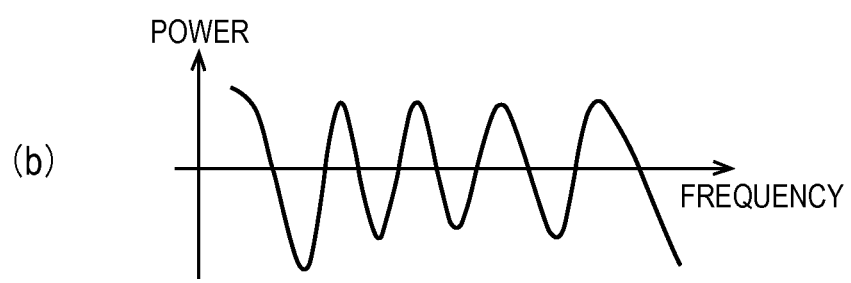
(b)

FIG. 21
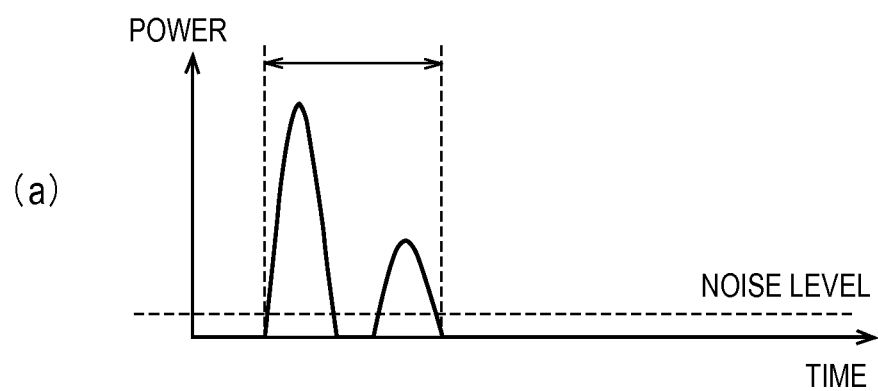
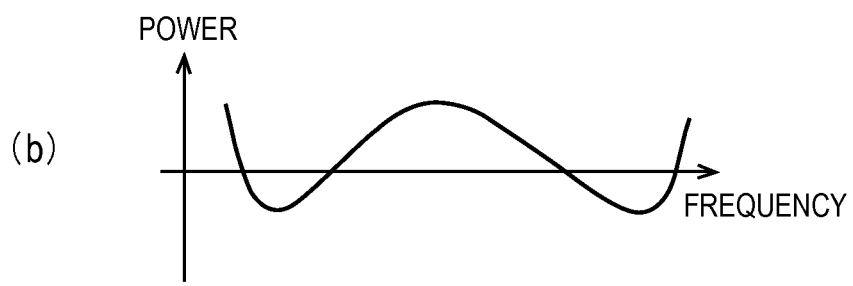

BASE STATION, PROCESSOR, COMMUNICATION CONTROL METHOD AND USER TERMINAL

TECHNICAL FIELD

The prevent invention relates to a base station used in a mobile communication system in which a radio signal including a reference signal is transmitted and received, a processor therefor, a communication control method therefor, and a user terminal.

BACKGROUND ART

In 3GPP (3rd Generation Partnership Project) which is a project aiming to standardize a mobile communication system, it is considered to introduce a new carrier to which a special physical layer specification is applied in addition to a conventional carrier to which a physical layer specification up to Release 11 is applied.

As one of the new carriers, a carrier in which the density of a reference signal is more decreased than a conventional carrier is proposed (for example, see Non Patent Document 1). As a result, a radio resource used for transmitting a reference signal can be used for transmitting user data, etc., and therefore, it is possible to improve throughput.

PRIOR ART DOCUMENT

Non-Patent Document

Non-Patent Document 1: 3GPP contribution "R1-121382"

SUMMARY OF THE INVENTION

A reference signal is a signal necessary for estimating a channel characteristic (so-called channel estimation). Therefore, when the density of the reference signal is decreased, it is probable that throughput deteriorates depending on each communication environment as a result of the accuracy of the channel estimation being decreased.

Therefore, the present invention provides a base station, a processor, a communication control method, and a user terminal with which it is possible to appropriately control the density of a reference signal.

According to an embodiment, a base station that communicates with a plurality of user terminals in a mobile communication system in which a radio signal including a reference signal for estimating a channel characteristic is transmitted and received, comprises: a control unit that changes a reference signal density that is a density of the reference signal applied to communication with the plurality of user terminals. The control unit calculates a statistics amount of communication quality information acquired for all the plurality of user terminals, and changes the reference signal density on the basis of the statistics amount.

BRIEF DESCRIPTION OF THE DRAWINGS

FIG. 20 is a diagram showing one example of a worst value of a delay dispersion range as a statistics amount according to the embodiment.
FIG. 21 is a diagram showing one example of a worst value of a delay dispersion range as a statistics amount according to the embodiment.

DESCRIPTION OF THE EMBODIMENT

[Overview of Embodiment]

Figure 1:
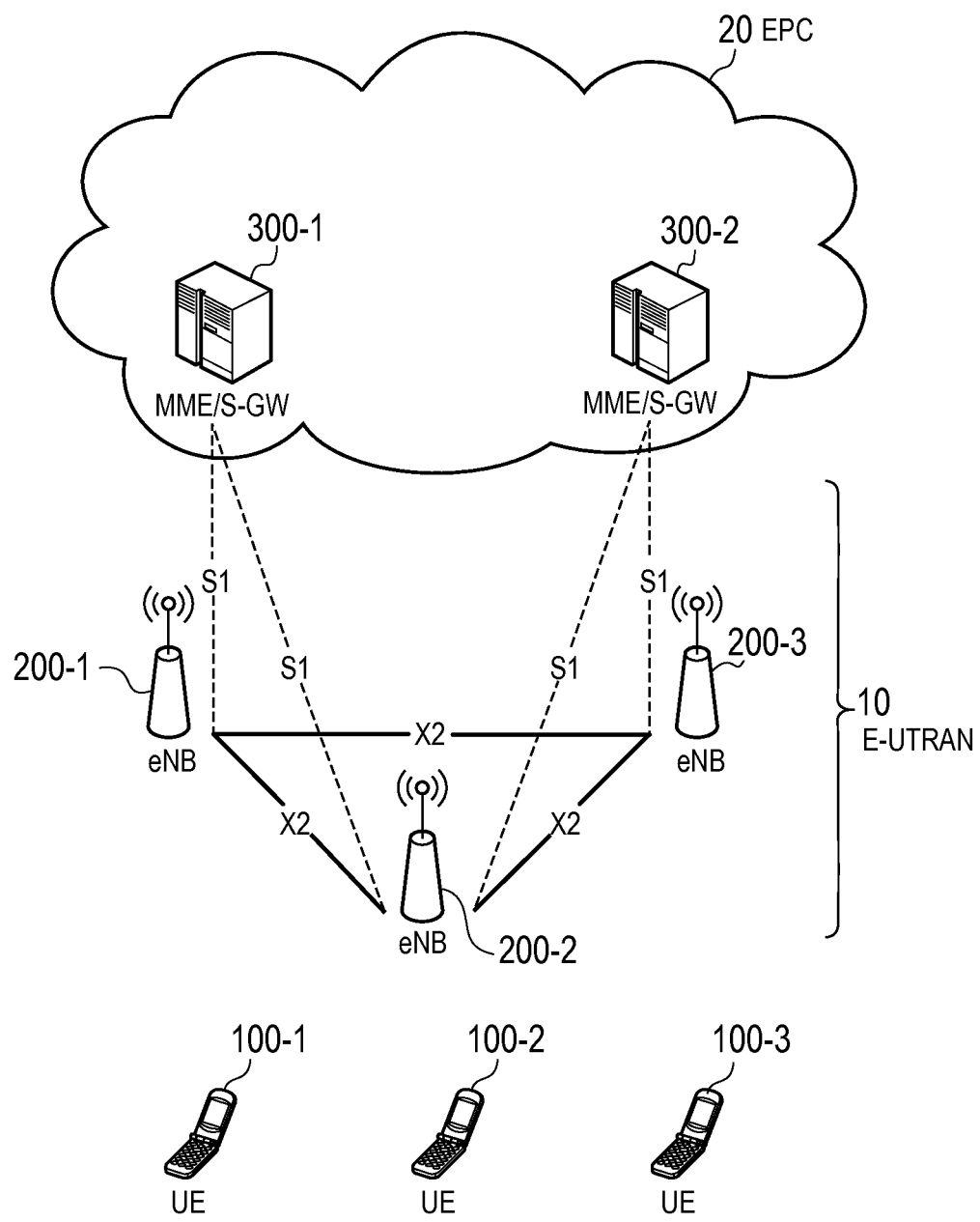
FIG. 1 is a configuration diagram of an LTE system according to an embodiment.

A base station according to an embodiment communicates with a plurality of user terminals in a mobile communication system in which a radio signal including a reference signal for estimating a channel characteristic is transmitted and received. The base station comprises: a control unit that changes a reference signal density that is a density of the reference signal applied to communication with the plurality of user terminals. The control unit calculates a statistics amount of communication quality information acquired for all the plurality of user terminals, and changes the reference signal density on the basis of the statistics amount.

As a result, it is possible to dynamically change a reference signal density while statistically determining a communication environment of all user terminal connected with the base station, on the basis of a statistics amount of communication quality information.

In the embodiment, the reference signal is a downlink reference signal commonly applied to the plurality of user terminals.

In the embodiment, the communication quality information is at least one of: throughput for each of the plurality of user terminals; CQI for each of the plurality of user terminals; a moving speed for each of the plurality of user terminals; and a delay dispersion range for each of the plurality of user terminals.

In the embodiment, the statistics amount is an average of the communication quality information, a worst value of the communication quality information, or a cumulative distribution function of the communication quality information.

In the embodiment, the control unit changes, when a predetermined reference signal density is used for the communication with the plurality of user terminals, the reference signal density to a reference signal density that is lower than the predetermined reference signal density, in accordance with improvement on the statistics amount.

In the embodiment, the control unit changes, when a predetermined reference signal density is used for the communication with the plurality of user terminals, the reference signal density to a reference signal density that is higher than the predetermined reference signal density, in accordance with deterioration of the statistics amount.

In the embodiment, the control unit excludes a user terminal, in which the degree of a variation of the corresponding communication quality information is greater than a threshold value, out of the plurality of user terminals, from a target for calculating the statistics amount.

In the embodiment, the control unit excludes a user terminal, in which a data amount corresponding to an application to be executed is smaller than a threshold value, out of the plurality of user terminals, from a target of calculating the statistics amount.

In the embodiment, the base station configures a small cell smaller than a macro cell, and the plurality of user terminals are connected with the small cell.

A processor according to the embodiment is provided in a base station that communicates with a plurality of user terminals in a mobile communication system in which a radio signal including a reference signal for estimating a channel characteristic is transmitted and received. The processor performs a process for calculating a statistics amount of communication quality information acquired for all the plurality of user terminals, and changing a reference signal density that is a density of the reference signal applied to communication with the plurality of user terminals on the basis of the statistics amount.

A communication control method according to the embodiment is used in a mobile communication system in which a radio signal including a reference signal for estimating a channel characteristic is transmitted and received. The communication control method comprises: a step A of changing, by a base station that communicates with a plurality of user terminals, a reference signal density that is a density of the reference signal applied to communication with the plurality of user terminals. In the step A, the control unit calculates a statistics amount of communication quality information acquired for all the plurality of user terminals, and changes the reference signal density on the basis of the statistics amount.

A user terminal according to the embodiment communicates with abase station in a mobile communication system in which a radio signal including a reference signal for estimating a channel characteristic is transmitted and received. The user terminal comprises: a storage unit that stores a plurality of reference signal patterns each having a different density of the reference signal; a reception unit that receives the radio signal including the reference signal, from the base station; and a control unit that determines a reference signal pattern applied to the received radio signal on the basis of a correlation value between the received radio signal and each of the plurality of reference signal patterns.

As a result, even when the reference signal pattern (that is, the density of the reference signal) is changed, a user terminal autonomously determines the changed reference signal pattern, and thus, it is possible to eliminate a need of signaling for notifying such a change. Therefore, it is possible to change the density of the reference signal without increasing the signaling.

In the embodiment, the reference signal is a downlink reference signal commonly applied to a plurality of user terminals that communicate with the base station.

In the embodiment, the control unit determines a reference signal pattern having a highest correlation value with the received radio signal, out of the plurality of reference signal patterns, as a reference signal pattern applied to the received radio signal.

In the embodiment, the control unit determines the reference signal pattern only when a difference between the correlation values calculated for each of the plurality of reference signal patterns is greater than a threshold value.

In the embodiment, when the base station changes the reference signal pattern at a predetermined timing, the control unit determines the reference signal pattern in accordance with the predetermined timing.

In the embodiment, the plurality of reference signal patterns include: a first reference signal pattern having a predetermined reference signal density in a frequency-axis direction; and a second reference signal pattern having a reference signal density lower than the predetermined reference signal density in a frequency-axis direction.

In the embodiment, the first reference signal pattern is a pattern in which the reference signals are arranged in all resource blocks in the frequency-axis direction, and the second reference signal pattern is a pattern in which the reference signals are arranged in only some resource blocks in the frequency-axis direction.

In the embodiment, the plurality of reference signal patterns include: a first reference signal pattern having a predetermined reference signal density in a time-axis direction; and a second reference signal pattern having a reference signal density lower than the predetermined reference signal density in the time-axis direction.

In the embodiment, the first reference signal pattern is a pattern in which the reference signals are arranged evenly in all subframes in a time-axis direction, and the second reference signal pattern is a pattern in which the reference signals are arranged evenly in some subframes in the time-axis direction, and the reference signals are partially arranged in the remaining subframes.

In the embodiment, the control unit increases, when it is possible to determine that there is a small variation in the channel characteristic, a priority of a reference signal pattern determined last time, and determines the reference signal pattern this time.

A processor according to the embodiment is provided in a user terminal that communicates with a base station in a mobile communication system in which a radio signal including a reference signal for estimating a channel characteristic is transmitted and received. The processor performs: a process for storing a plurality of reference signal patterns each having a different density of the reference signal; a process for receiving the radio signal including the reference signal, from the base station; and a process for determining a reference signal pattern applied to the received radio signal on the basis of a correlation value between the received radio signal and each of the plurality of reference signal patterns.

A communication control method according to the embodiment is used for a user terminal that communicates with a base station in a mobile communication system in which a radio signal including a reference signal for estimating a channel characteristic is transmitted and received. The communication control method comprises: a step A of storing a plurality of reference signal patterns each having a different density of the reference signal; a step B of receiving the radio signal including the reference signal, from the base station; and a step C of determining a reference signal pattern applied to the received radio signal on the basis of a correlation value between the received radio signal and each of the plurality of reference signal patterns.

[Embodiment]

Hereinafter, with reference to the accompanying drawings, a description will be provided for an embodiment when the present invention is applied to a mobile communication system (an LTE system) configured in accordance with 3GPP standards.

(LTE System)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 configures a cell or a plurality of cells and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes a plurality of MME (Mobility Management Entity)/S-GWs (Serving-Gateways) 300.

The MME is a network node for performing various mobility controls, for example, for the UE 100 and corresponds to a controller. The S-GW is a network node that performs transfer control of user data and corresponds to a mobile switching center. The EPC 20 including the MME/S-GW 300 accommodates the eNB 200.

The eNBs 200 are connected mutually via an X2 interface. Furthermore, the eNB 200 is connected to the MME/S-GW 300 via an S1 interface.

Next, the configurations of the UE 100 and the eNB 200 will be described.

Figure 2:
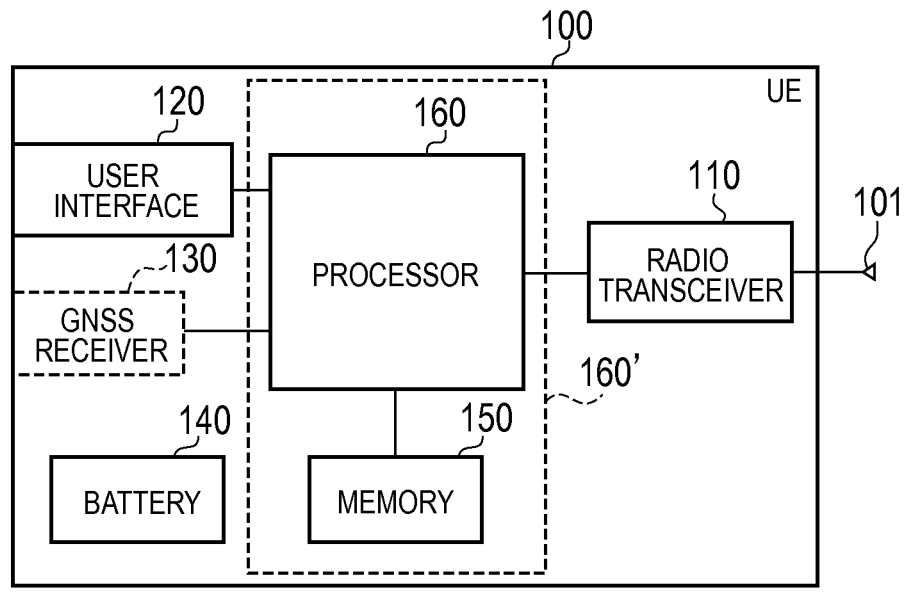
FIG. 2 is a block diagram of UE according to the embodiment.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs coding and decoding of sound and video signals. The processor 160 implements various processes and various communication protocols described later.

Figure 3:
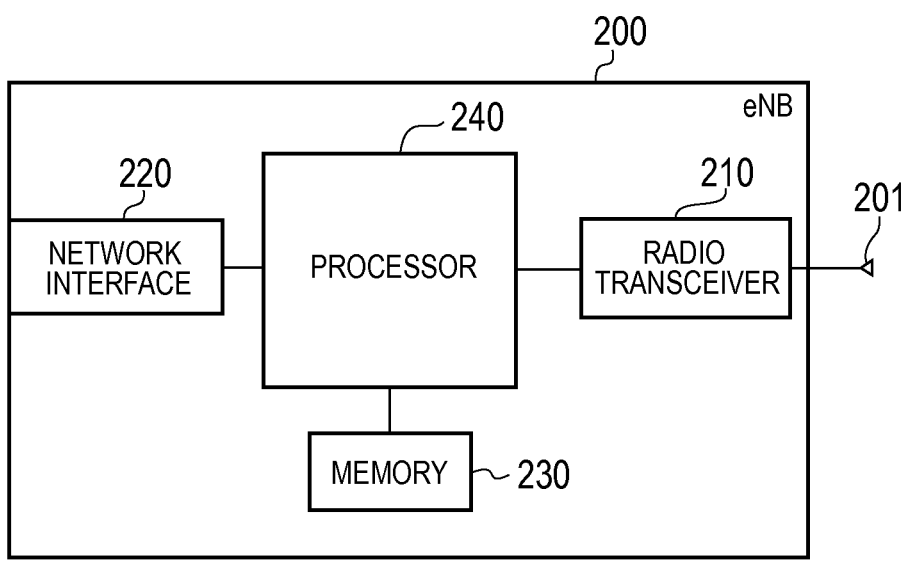
FIG. 3 is a block diagram of eNB according to the embodiment.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a control unit. It is noted that the memory 230 may be integrally formed with the processor 240, and this set (that is, a chipset) may be called a processor.

The antenna 201 and the radio transceiver 210 are used to transmit and receive a radio signal. The antenna 201 includes a plurality of antenna elements. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
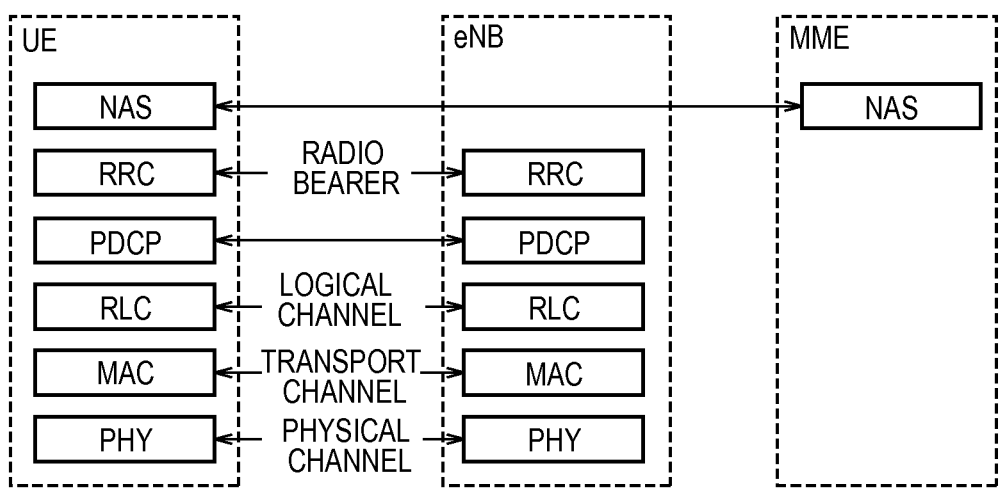
FIG. 4 is a protocol stack diagram of a radio interface in the LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (an HARQ). Between the MAC layer of the UE 100 and the MAC layer of the eNB 200, data is transmitted via a transport channel. The MAC layer of the eNB 200 includes a scheduler that determines an uplink and downlink transport format (a transport block size, a modulation and coding scheme and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connection state (RRC connected state), and when the RRC connection is not established, the UE 100 is in an idle state (RRC idle state).

A NAS (Non-Access Stratum) layer positioned above the RRC layer performs session management or mobility management, for example.

Figure 5:
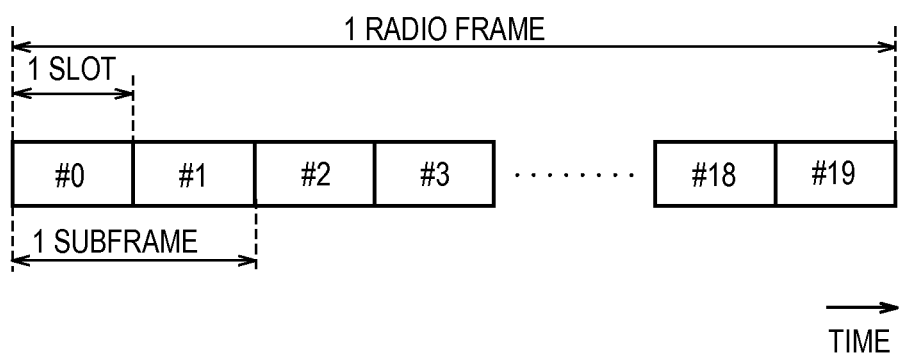
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at ahead thereof with a guard interval called a cyclic prefix (CP). The resource block includes a plurality of subcarriers in the frequency direction. A minimum resource unit configured by one subcarrier and one symbol is called a resource element (RE).

Also, Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the other interval of each subframe is a region mainly used as a physical downlink shared channel (PDSCH).

In a downlink, downlink reference signals such as a cell-specific reference signal (CRS) and/or a channel-state-information reference signal (CSI-RS) are dispersed and arranged in each subframe. The downlink reference signal is configured by a predetermined orthogonal signal sequence, and arranged in a predetermined resource element.

In the uplink, both end portions in the frequency direction of each subframe are control regions mainly used as a physical uplink control channel (PUCCH). Furthermore, the center portion, in the frequency direction, of each subframe is a region mainly used as a physical uplink shared channel (PUSCH).

(Operation According to Embodiment)

Hereinafter, an operation according to the present embodiment will be described.

(1) Operation Overview

Figure 6:
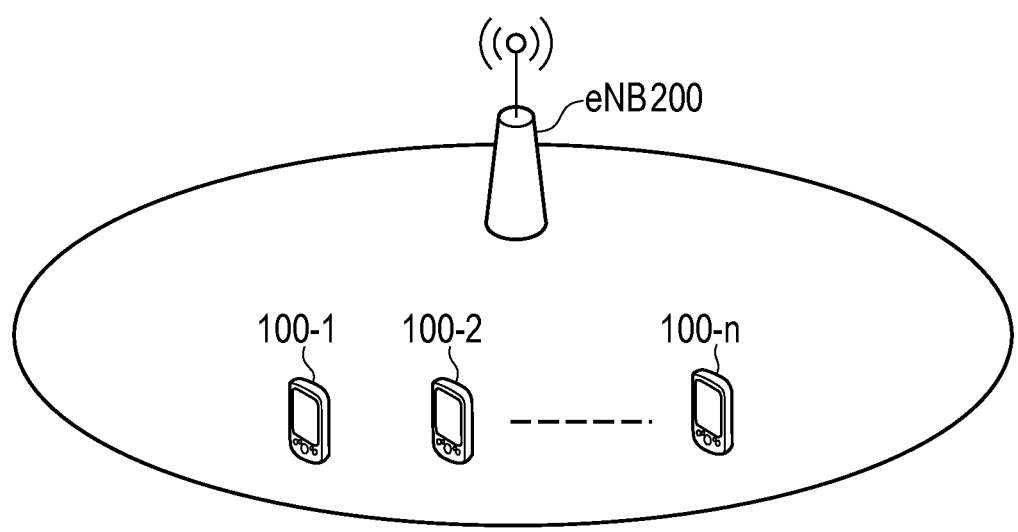
FIG. 6 is a diagram illustrating an operation environment according to the embodiment.

FIG. 6 is a diagram showing an operation environment according to the present embodiment. In the present embodiment, a downlink is mainly described.

As shown in FIG. 6, UE 100-1 to UE 100-n each establish a connection with the eNB 200, and communicate with the eNB 200.

In the present embodiment, a case where the eNB 200 uses one carrier in the downlink is assumed. However, the eNB 200 may use a plurality of carriers in the downlink. The plurality of carriers may include a primary carrier (primary cell) and a secondary carrier (secondary cell).

The eNB 200 transmits a radio signal including CRS and/or CSI-RS in the downlink. The CRSs and/or CSI-RSs are arranged over the entire carrier band. The CRS and/or CSI-RS are a downlink common reference signal applied in common to a plurality of UEs 100. The CRS and/or CSI-RS are referred to as a "downlink reference signal", below.

It is noted that in addition to transmitting the CRS and/or CSI-RS, the eNB 200 transmits DMRS that is a demodulation reference signal of a downlink, applied individually to the UE 100.

On the basis of the downlink reference signal included in the radio signal received from the eNB 200, the UE 100 estimates a channel characteristic between the UE 100 and the eNB 200 (channel estimation), and feeds back channel state information (CSI) to the eNB 200 on the basis of a result of the channel estimation.

It is noted that the channel estimation is a process in which a channel estimation value in RE unit is subject to an averaging process or a filter process in a frequency-axis direction or a time-axis direction so as to evaluate a channel characteristic in which influence such as noise is minimized.

CSI is at least one of: channel quality information (CQI; Channel Quality Indicator), precoder matrix information (PMI; Precoder Matrix Indicator), and rank information (RI; Rank Indicator). CQI is an index showing a modulation and coding scheme (MCS) recommended in a downlink. PMI is an index showing a precoder matrix recommended in a downlink. RI is an index showing a rank recommended in a downlink.

The eNB 200 controls a downlink communication with the UE 100 on the basis of the CSI fed back from the UE 100. For example, the eNB 200 performs scheduling for the UE 100 on the basis of the CQI. Further, the eNB 200 controls a multi-antenna transmission for the UE 100 on the basis of the PMI and the RI.

In the present embodiment, the eNB 200 dynamically changes a density of a downlink reference signal applied to communication among the UE 100-1 to the UE 100-n (hereinafter, "reference signal density"). Specifically, the eNB 200 calculates a statistics amount of communication quality information acquired for all the UE 100-1 to the UE 100-*n*, and changes the reference signal density on the basis of the statistics amount.

The communication quality information is at least one of: throughput for each UE 100, CQI for each UE 100, a moving speed for each UE 100, or a delay dispersion range for each UE 100, for example. Further, examples of the statistics amount include an average of communication quality information, a worst value of communication quality information, or a cumulative distribution function (CDF) of communication quality information.

For example, when the eNB 200 uses a predetermined reference signal density for the communication with the UE 100-1 to the UE 100-*n*, the eNB 200 changes the reference signal density to a reference signal density lower than the predetermined reference signal density in accordance with improvement on the statistics amount.

Further, when the eNB 200 uses a predetermined reference signal density for the communication with the UE 100-1 to the UE 100-*n*, the eNB 200 changes the reference signal density to a reference signal density higher than the predetermined reference signal density in accordance with deterioration of the statistics amount.

The eNB 200 changes the reference signal density by changing an arrangement pattern of the downlink reference signal in a radio signal (hereinafter, "reference signal pattern").

The UE 100 previously stores a plurality of reference signal patterns in which the reference signal density differs. The UE 100 determines the reference signal pattern applied to the received radio signal on the basis of a correlation value between the radio signal received from the eNB 200 and each of the plurality of reference signal patterns.

Specifically, the UE 100 determines, as the reference signal pattern applied to the received radio signal, a reference signal pattern having the highest correlation value with the received radio signal out of the plurality of reference signal patterns. Then, the UE 100 performs the above-described channel estimation on the basis of the determined reference signal pattern.

(2) Reference Signal Pattern

Next, the reference signal pattern according to the present embodiment will be described. The reference signal pattern regarding the CRS will be mainly described below.

In the present embodiment, as the reference signal pattern, two reference signal patterns, that is, a first reference signal pattern having a predetermined reference signal density (hereinafter, "reference signal pattern A"), and a second reference signal pattern having a reference signal density lower than the predetermined reference signal density (hereinafter, "reference signal pattern B"), are used. However, the number of the reference signal patterns is not limited to two, and may be three or more.

Figure 7:
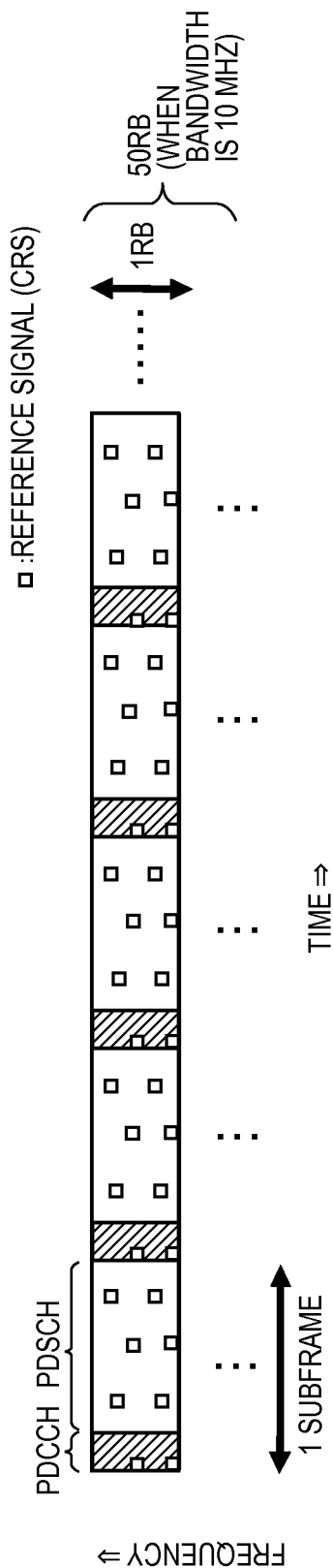
FIG. 7 is a frame configuration diagram for explaining a reference signal pattern A according to the embodiment.

FIG. 7 is a frame configuration diagram for explaining the reference signal pattern A according to the present embodiment.

As shown in FIG. 7, in the reference signal pattern A, the downlink reference signals are dispersed and arranged in a time-axis direction and a frequency-axis direction. Specifically, in the time-axis direction, the downlink reference signals are arranged in all the subframes. Further, in the frequency-axis direction, the downlink reference signals are arranged in all the resource blocks (RBs).

Figure 8:
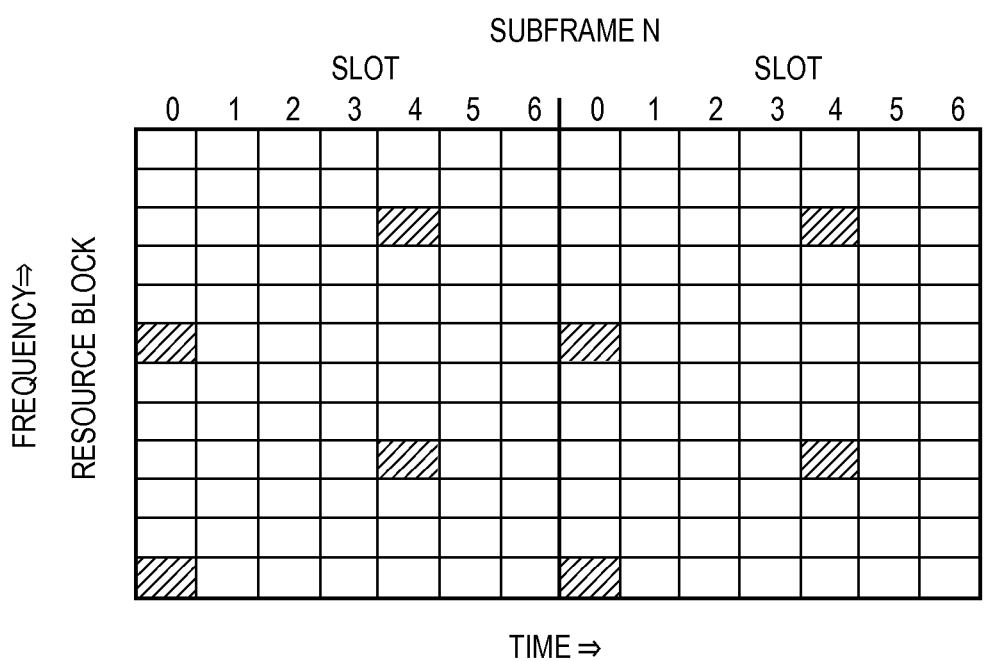
FIG. 8 is a diagram illustrating an arrangement example of a downlink reference signals in one subframe and one RB.

FIG. 8 is a diagram showing an arrangement example of the downlink reference signals in one subframe and one RB.

As shown in FIG. 8, four REs are secured as a reference signal-use resource in each of first-half slots and second-half slots in one subframe (subframe N), and thus, a total of eight REs are secured as the reference signal-use resource.

Next, the reference signal pattern B will be described while focusing on a difference from the reference signal pattern A.

Figure 9:
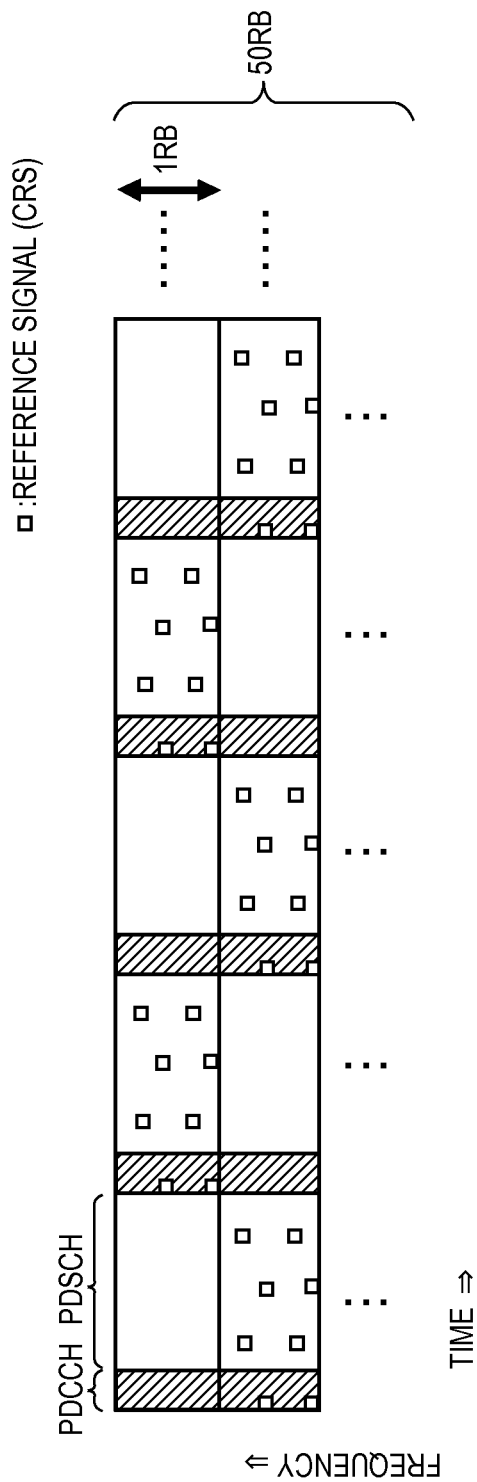
FIG. 9 is a frame configuration diagram for explaining a specific example 1 of a reference signal pattern B according to the embodiment.

FIG. 9 is a frame configuration diagram for explaining a specific example 1 of the reference signal pattern B.

As shown in FIG. 9, in the specific example 1 of the reference signal pattern B, the downlink reference signals are not arranged in all the subframes in the time-axis direction, and are arranged only in either one of the consecutive two subframes. Further, the downlink reference signals are not arranged in all the RBs in the frequency-axis direction, and are arranged only in either one of the consecutive two RBs.

Figure 10:
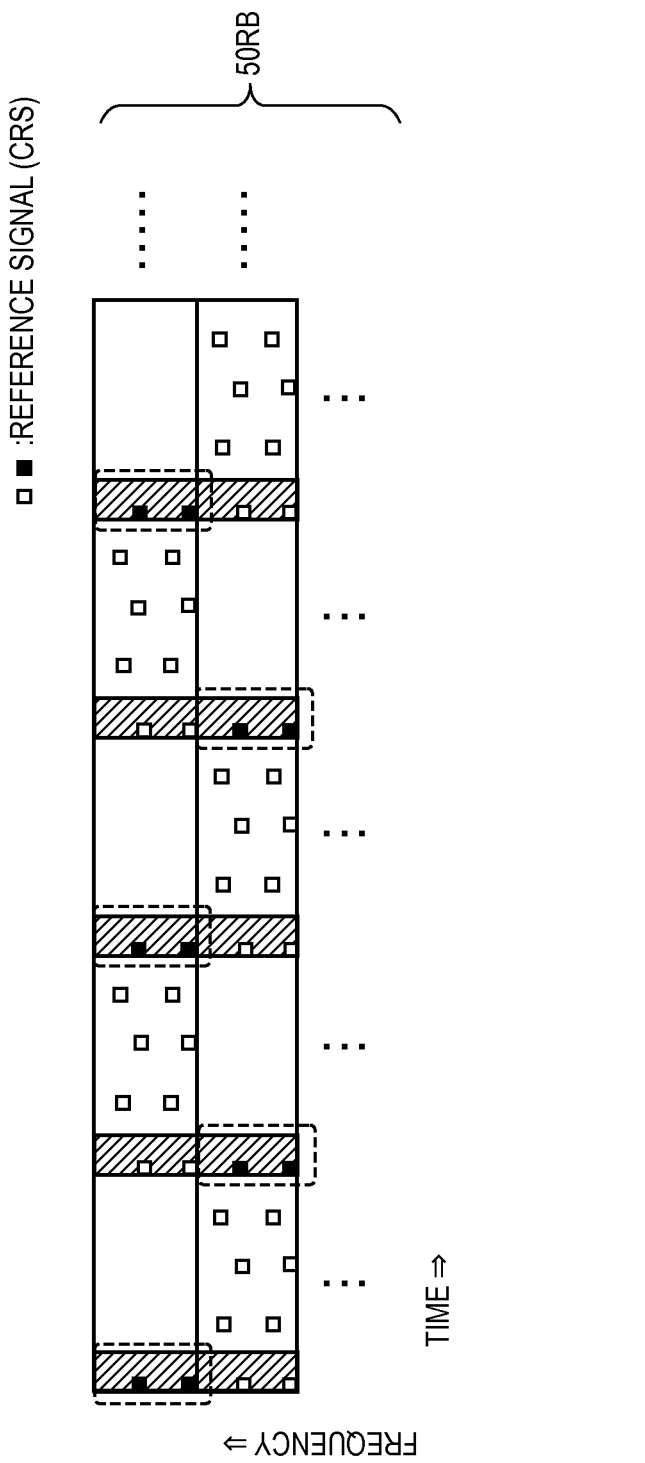
FIG. 10 is a frame configuration diagram for explaining a specific example 2 of the reference signal pattern B according to the embodiment.

FIG. 10 is a frame configuration diagram for explaining a specific example 2 of the reference signal pattern B.

As shown in FIG. 10, the specific example 2 of the reference signal pattern B differs from the above-described specific example 1 in that a downlink reference signal in a control region (PDCCH region) is left. As a result, it becomes possible to use the downlink reference signal for decoding PDCCH.

Figure 11:
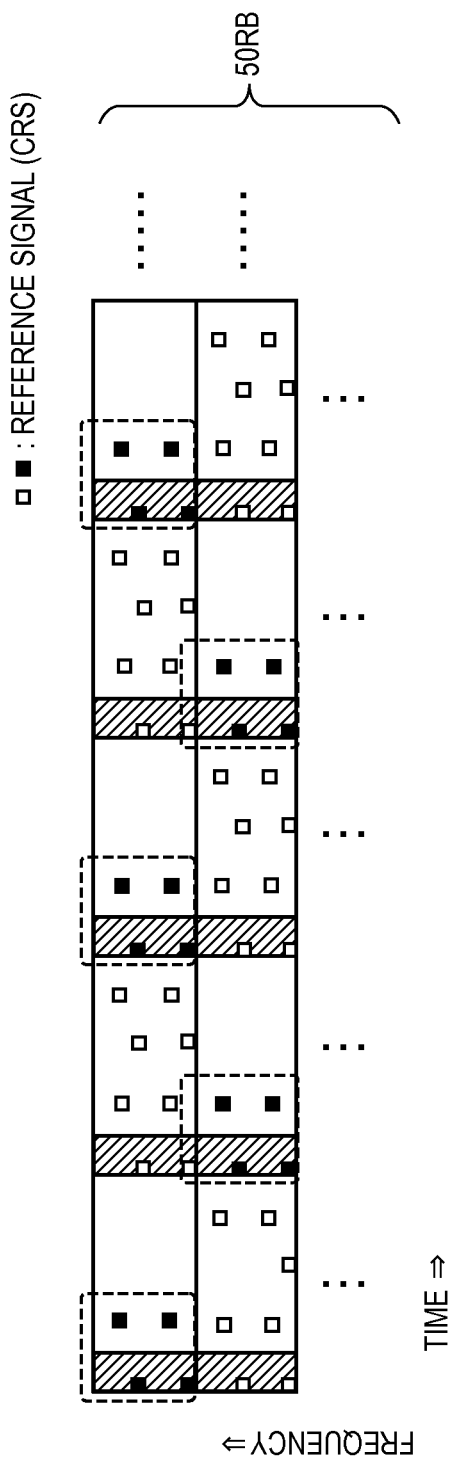
FIG. 11 is a frame configuration diagram for explaining a specific example 3 of the reference signal pattern B according to the embodiment.

FIG. 11 is a frame configuration diagram for explaining a specific example 3 of the reference signal pattern B.

As shown in FIG. 11, the specific example 3 of the reference signal pattern B differs from the above-described specific example 1 in that the downlink reference signal in the control region is left and a downlink reference signal in a head portion (or a first-half portion) in a data region (PDSCH region) is left. As a result, it becomes possible to use the downlink reference signal for decoding PDSCH.

Thus, the specific examples 2 and 3 of the reference signal pattern B is a pattern in which, in the time-axis direction, the downlink reference signals are arranged evenly in some of the subframes and the downlink reference signals are arranged partially in the remaining subframe.

It is noted that a position of the RE used as the reference signal resource may be the same between the reference signal patterns A and B, and the position of the RE used as the reference signal resource may differ between the reference signal patterns A and B.

(3) Operation Sequence

Figure 12:
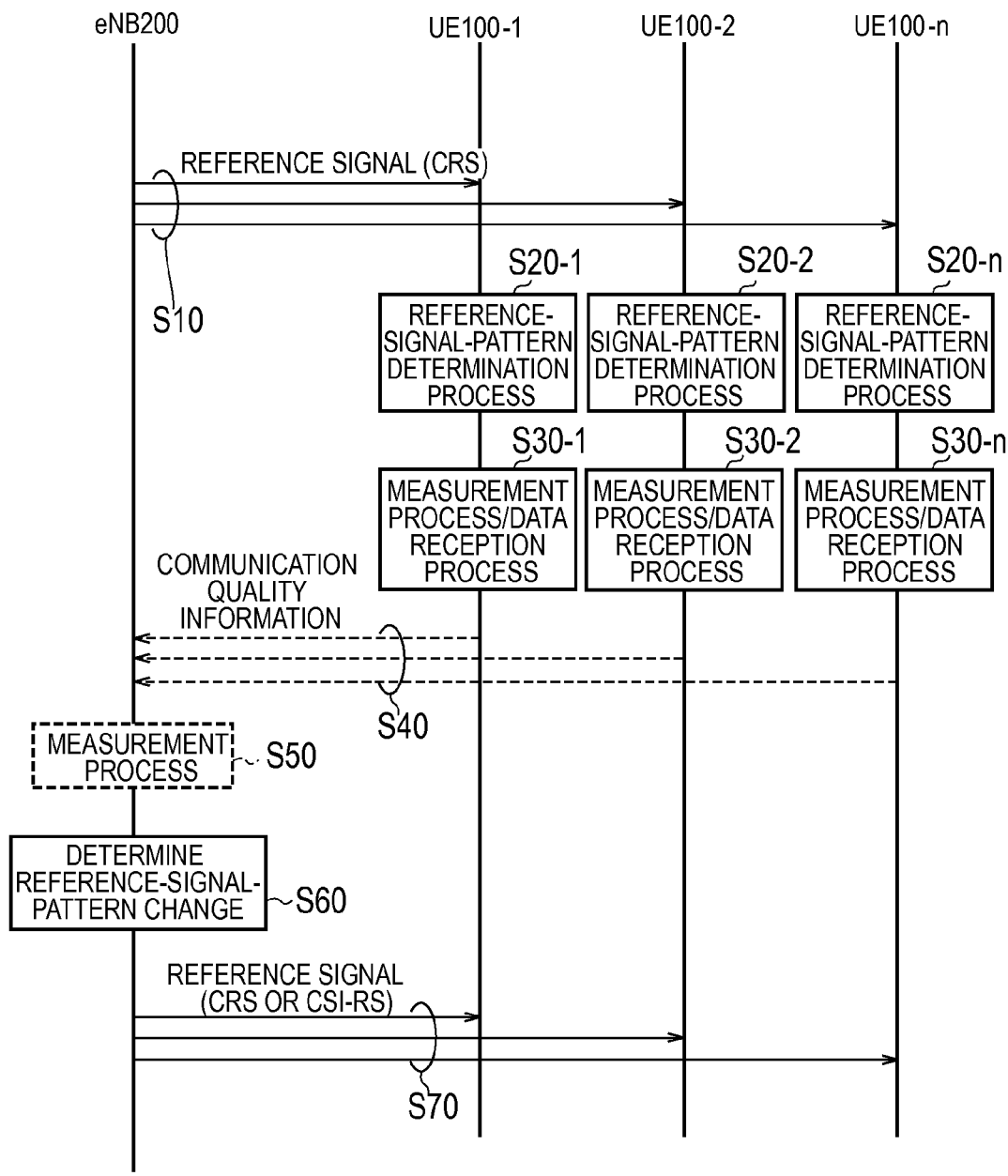
FIG. 12 is an operation sequence diagram according to the embodiment.

Next, an operation sequence according to the present embodiment will be described. FIG. 12 is an operation sequence diagram according to the present embodiment.

As shown in FIG. 12, in step S10, the eNB 200 transmits the radio signal including the downlink reference signal. The UE 100-1 to the UE 100-*n* each receive the radio signal including the downlink reference signal.

In step S20, the UE 100-1 to the UE 100-*n* each determine the reference signal pattern applied to the radio signal received in step S10. A process for determining the reference signal pattern will be described in detail later.

In step S30, the UE 100-1 to the UE 100-*n* each perform a measurement process including the channel estimation on the basis of the downlink reference signal having the reference signal pattern determined in step S20. Further, the UE 100-1 to the UE 100-*n* each perform a reception process for user data on the basis of a result of the channel estimation.

In step S40, the UE 100-1 to the UE 100-*n* each transmit the communication quality information to the eNB 200. The communication quality information transmitted in this step is information indicating communication quality measured by the UE 100, and is throughput or CQI, for example. The throughput preferably is throughput for each predetermined time width rather than instantaneous throughput. It is noted that the moving speed measured in the UE 100 itself may be the communication quality information. The eNB 200 receives the communication quality information.

In step S50, the eNB 200 performs measurement process for an uplink, on each of the UE 100-1 to the UE 100-*n*. For example, the eNB 200 measures the delay dispersion range for each UE 100, as the communication quality information. It is noted that the eNB 200 may measure a phasing frequency for each UE 100, and acquire a moving speed estimated from the phasing frequency, as the communication quality information.

It is noted that both or only either one of steps S40 and S50 may be executed.

In step S60, the eNB 200 determines whether to change the reference signal pattern. Specifically, the eNB 200 calculates the statistics amount of the communication quality information acquired for all the UE 100-1 to the UE 100-*n*, and makes the determination on the basis of the statistics amount. A process for changing the reference signal pattern will be described in detail later.

In this case, description is provided on assumption that it is determined that the reference signal pattern is changed.

In step S70, the eNB 200 transmits the radio signal including the downlink reference signal by applying the changed reference signal pattern. The UE 100-1 to the UE 100-*n* each receive the radio signal including the downlink reference signal. Thereafter, processes after step S20 are performed again.

It is noted that a cycle in which the eNB 200 determines to change the reference signal pattern may be one subframe or two subframes. This cycle is shared with the UE 100, and the UE 100 determines the reference signal pattern at a timing corresponding to the cycle in which the eNB 200 determines to change the reference signal pattern. As a result, it is possible to avoid wasted correlation calculation being performed in the UE 100.

(4) Operation of UE 100

Figure 13:
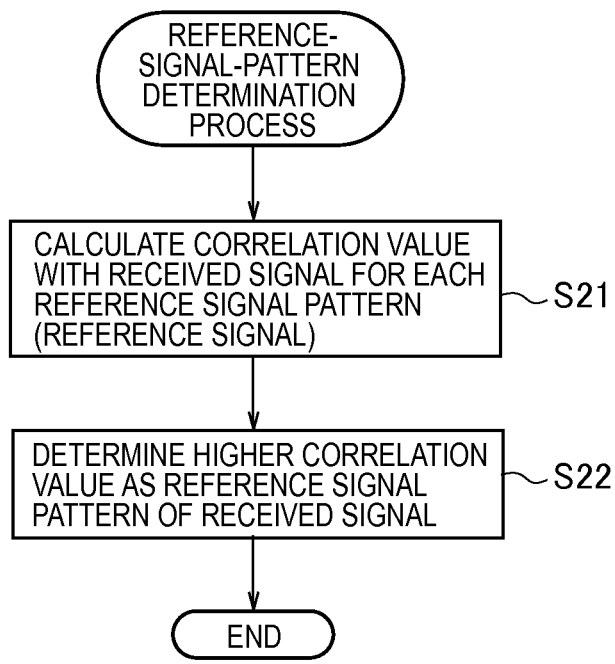
FIG. 13 is an operation flowchart showing a detail of step S20 in FIG. 12.

Next, an operation of the UE 100 according to the present embodiment will be described. FIG. 13 is an operation flowchart showing a reference-signal-pattern determination process by the UE 100, that is, a details of step S20 in FIG. 12.

As a precondition for the present operation flow, the memory 150 previously stores the reference signal patterns A and B as a reference signal. Further, when the eNB 200 changes the reference signal pattern at a predetermined timing, the processor 160 executes the present operation flow in tune with the predetermined timing.

As shown in FIG. 13, in step S21, the processor 160 calculates correlation values A and B between a radio signal received from the eNB 200 by the radio transceiver 110 (hereinafter, "received signal") and each of the reference signal patterns A and B.

In this case, the received signal for correlation preferably is a signal obtained after the channel estimation and the channel equalization thereof on the assumption of sequences of the reference signal patterns A and B rather than a raw received value. It is noted that the channel estimation is a process in which a channel estimation value in RE unit is subject to an averaging process or a filter process in a frequency-axis direction or a time-axis direction so as to evaluate a channel characteristic in which influence such as noise is minimized. The channel equalization is a process in which an inverse characteristic of the channel characteristic evaluated above is multiplied so as to restore the influence of the channel.

The correlation value A can be calculated according to the below Equation (1), where "Ai" denotes a reference signal corresponding to the reference signal pattern A and "Rxi" denotes the received signal.

[Equation 1]

$$\text{Correlation value } A = \text{Re}\left[\frac{1}{N}\sum_{i=1}^{N} A_i Rx_i^*\right] \quad (1)$$

where "i" denotes an index of a reference RE and "N" denotes an RE number used for a correlation process. Further, the above Equation is such that Ai and Rxi are both set when power (amplitude) of a signal is assumed to be normalized to 1. It is noted that the RE for correlation may be freely bundled in the time-axis direction or in the frequency-axis direction. Alternately, when determination is made in a unit of subframe, all REs in a subframe may be one group.

The correlation value B can be calculated according to the below Equation (2) obtained by modifying the above Equation (1), where "Bi" denotes a reference signal corresponding to the reference signal pattern B.

[Equation 2]

$$\text{Correlation value } B = \text{Re}\left[\frac{1}{N}\sum_{i=1}^{N} B_i Rx_i^*\right] \quad (2)$$

In step S22, the processor 160 compares the correlation values A and B calculated in step S21, and determines a reference signal pattern corresponding to a higher correlation value, as a reference signal pattern applied to the received signal. When the reference signal pattern is determined in this manner, the processor 160 performs a channel estimation, etc., on the basis of the determined reference signal pattern, in a reception process of PDCCH, PDSCH, etc.

It is noted that only when a difference between the correlation values A and B (absolute value of a difference |A−B|) is greater than a threshold value, the reference signal pattern may be determined. That is, when the difference between the correlation values A and B is equal to or less than the threshold value, the processor 160 continues to apply the reference signal pattern determined last time without determining the reference signal pattern, and waits for determining a reference signal pattern next.

Further, when it is possible to determine that a variation of the channel characteristic is small, the processor 160 may raise the priority of the reference signal pattern determined last time, and then, may determine the reference signal pattern this time. This is because when there is a small variation in the channel characteristic, it is highly probable that the reference signal pattern determined last time is maintained.

Figure 14:
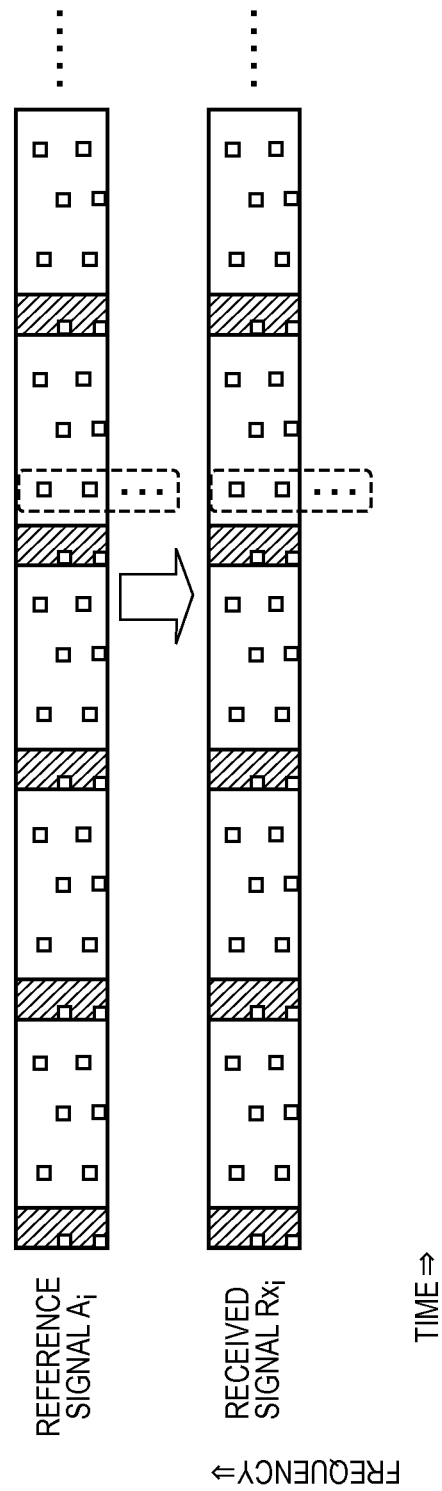
FIG. 14 is a diagram for explaining a specific example of a reference pattern determination according to the embodiment.
Figure 15:
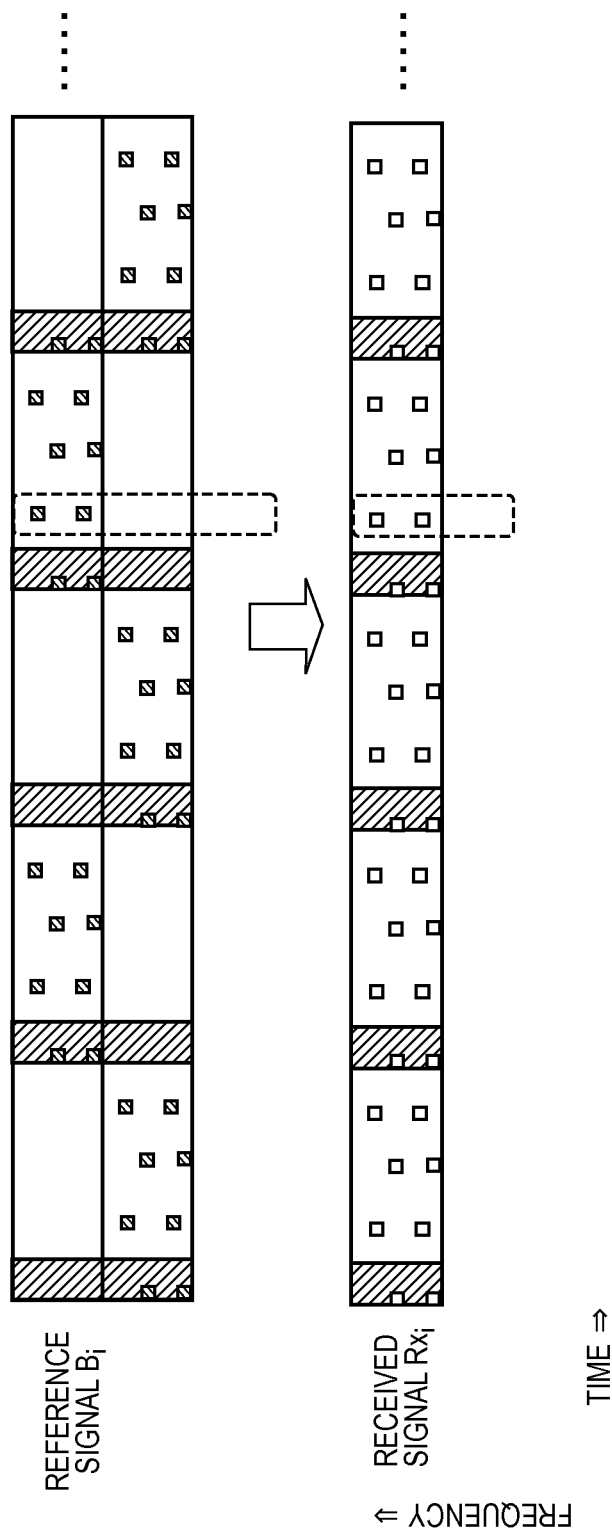
FIG. 15 is a diagram for explaining a specific example of a reference signal pattern determination according to the embodiment.

FIG. 14 and FIG. 15 are diagrams for explaining a specific example of a reference signal pattern determination. In this case, one example is described in which when the reference signal pattern applied to the received signal is the reference signal pattern A, the processor 160 determines the reference signal pattern.

As shown in FIG. 14, the processor 160 calculates a correlation value A between the received signal Rxi and the reference signal Ai corresponding to the reference signal pattern A, in accordance with the above Equation (1).

As shown in FIG. 15, the processor 160 calculates a correlation value B between the received signal Rxi and the reference signal Bi corresponding to the reference signal pattern B, in accordance with the above Equation (2)

In this example, the reference signal pattern applied to the received signal is the reference signal pattern A, and thus, the correlation value A becomes higher than the correlation value B. Therefore, the processor 160 determines that the reference signal pattern applied to the received signal is the reference signal pattern A.

(5) Operation of eNB 200

Figure 16:
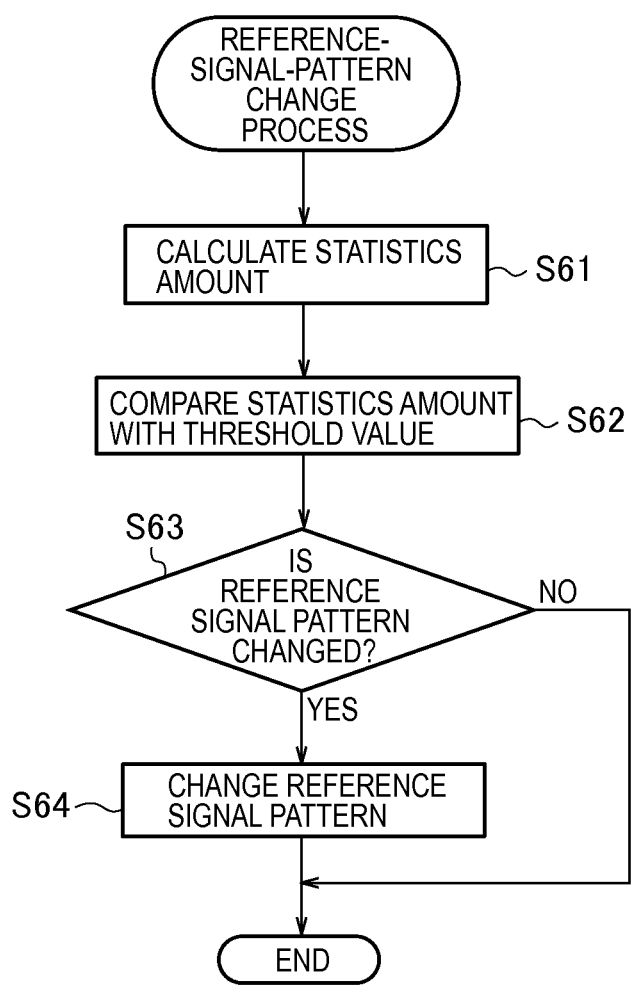
FIG. 16 is an operation flowchart showing a detail of step S60 in FIG. 12.

Next, an operation of the eNB 200 according to the present embodiment will be described. FIG. 16 is an operation flowchart showing a reference-signal-pattern change process by the eNB 200, that is, a detail of step S60 in FIG. 12.

As shown in FIG. 16, in step S61, the processor 240 calculates a statistics amount of the communication quality information acquired for all the UE 100-1 to the UE 100-n. The communication quality information is at least one of: throughput for each UE 100, CQI for each UE 100, a moving speed for each UE 100, or a delay dispersion range for each UE 100, for example. Further, examples of the statistics amount include an average of communication quality information, a worst value of communication quality information, or CDF of communication quality information.

In this case, the processor 240 may exclude UE 100, in which the degree of a variation of the corresponding communication quality information is greater than a threshold value, out of the UE 100-1 to the UE 100-n, from a target of calculating the statistics amount. As a result, it becomes possible to appropriately calculate the statistics amount. For example, the statistics amount is calculated while only UE 100 having a small time dispersion such as throughput is subject to calculation.

Further, the processor 240 excludes, UE 100 in which a data amount corresponding to an application to be executed is less than a threshold value, out of the UE 100-1 to the UE 100-n, from a target of calculating the statistics amount. This is because it is not necessary to improve the throughput in the UE 100 to and from which a small amount of data is transmitted and received.

In step S62, the processor 240 compares the statistics amount calculated instep S61 with a threshold value.

In step S63, the processor 240 determines whether to change the reference signal pattern in response to a comparison result in step S62.

When it is determined that the reference signal pattern is changed (step S63; YES), the processor 240 changes the reference signal pattern in step S64.

Next, a specific example in which it is determined to change the reference signal pattern will be described.

Firstly, a specific example in which the communication quality information is throughput for each UE 100 will be described. When the communication quality information is throughput for each UE 100, the statistics amount can be average throughput or CDF.

Figure 17:
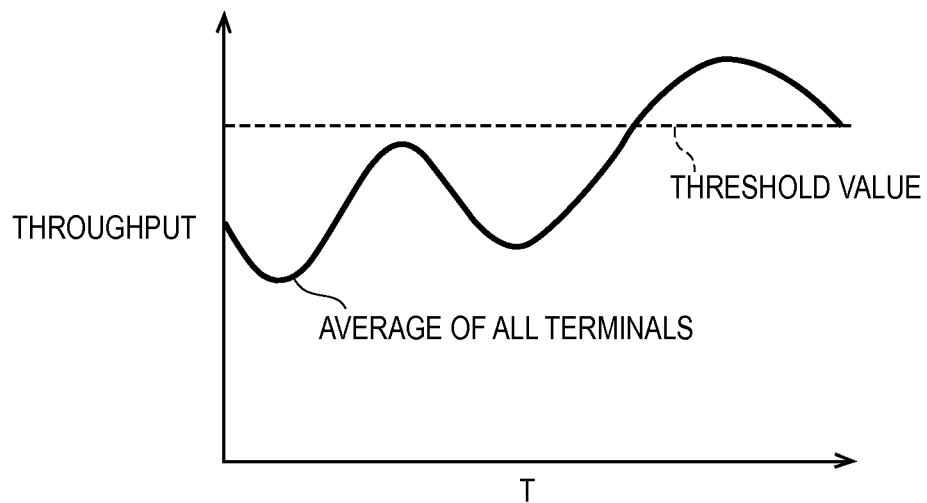
FIG. 17 is a diagram showing one example of an average throughput as a statistics amount according to the embodiment.

FIG. 17 is a diagram showing one example of the average throughput as the statistics amount.

As shown in FIG. 17, the average throughput changes along with passage of time. The processor 240 compares the average throughput at current time point t with a threshold value. The threshold value can be set according to the below Equation (3).

[Equation 3]

$$Threshold\ value = \frac{theoretical\ MaxThroughput}{the\ number\ of\ connection UE} \quad (3)$$

When the average throughput is smaller than the threshold value, the processor 240 applies the reference signal pattern A having a high reference signal density in order to improve a communication environment (improve channel estimation accuracy).

In contrast, when the average throughput is greater than the threshold value, the processor 240 applies the reference signal pattern B having a low reference signal density in order to improve the throughput.

It is noted that the average throughput may be the average throughput at current time point t and may also be a value obtained by weighting and averaging a past value and a current value. The processor 240 calculates a weighted average so that the weight of the current value is larger.

Figure 18:
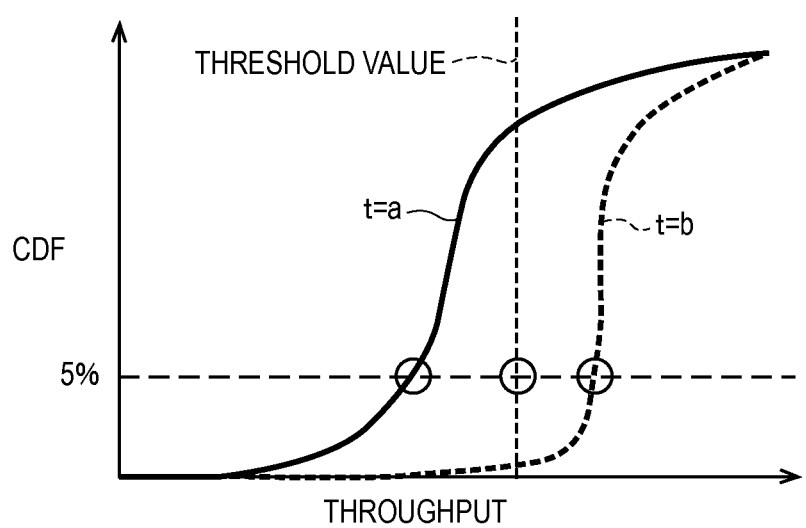
FIG. 18 is a diagram showing one example of throughput CDF as a statistics amount according to the embodiment.

FIG. 18 is a diagram showing one example of the throughput CDF as the statistics amount.

As shown in FIG. 18, throughputs are arranged in ascending order and then a cumulative distribution is obtained. FIG. 18 shows CDF at a time a and CDF at a time b.

When the number of the UEs 100 that stay in the bottom 5% of throughput is less than a threshold value, the processor 240 applies the reference signal pattern A having a high reference signal density in order to improve the communication environment (improve the channel estimation accuracy).

In contrast, when the number of the UEs 100 that stay in the bottom 5% of throughput is equal to or more than the threshold value, the processor 240 applies the reference signal pattern B having a low reference signal density in order to improve the throughput.

Therefore, the reference signal pattern A is applied to the time a, and the reference signal pattern B is applied to the time b.

Figure 19:
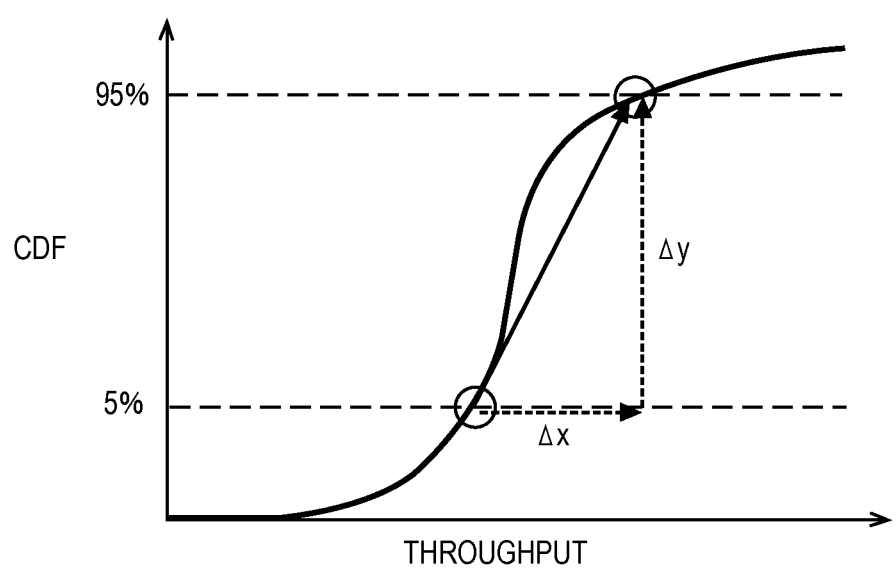
FIG. 19 is a diagram showing one example of throughput CDF as a statistics amount according to the embodiment.

FIG. 19 is a diagram showing one example of throughput CDF, as the statistics amount.

As shown in FIG. 19, the processor 240 calculates a gradient between 5% and 95% in CDF (=$\Delta y/\Delta x$), and compares the calculated gradient with a previously set threshold value of a gradient. It is possible to understand that the greater the gradient between 5% and 95% in CDF, the more stable the communication environment of all the UEs 100.

When the calculated gradient is smaller than the threshold value, the processor 240 applies the reference signal pattern A having a high reference signal density in order to improve the communication environment (improve the channel estimation accuracy).

In contrast, when the calculated gradient is greater than the threshold value, the processor 240 applies the reference signal pattern B having a low reference signal density in order to improve the throughput.

Secondly, a specific example in which the communication quality information is CQI for each UE 100 will be described. When the communication quality information is CQI for each UE 100, the statistics amount may be an average CQI. The CQI is indicated in numerical value from 0 to 15, for example, and the greater the value, the better the communication environment.

When the average CQI is smaller than a threshold value, the processor 240 applies the reference signal pattern A having a high reference signal density in order to improve the communication environment (improve the channel estimation accuracy).

In contrast, when the average CQI is greater than the threshold value, the processor 240 applies the reference signal pattern B having a low reference signal density in order to improve the throughput.

Thirdly, a specific example in which the communication quality information is the moving speed for each UE 100 will be described. When the communication quality information is the moving speed for each UE 100, the statistics amount may be an average moving speed. It is possible to understand that the lower the moving speed, the more stable the communication environment.

When the average moving speed is greater than a threshold value, the processor 240 applies the reference signal pattern A having a high reference signal density in order to improve the communication environment (improve the channel estimation accuracy).

In contrast, when the average moving speed is smaller than the threshold value, the processor 240 applies the reference signal pattern B having a low reference signal density in order to improve the throughput.

It is noted that when the communication quality information is the moving speed for each UE 100, it is possible to appropriately adjust the channel estimation accuracy by changing the reference signal density in the time-axis direction rather than by changing the reference signal density in the frequency-axis direction.

Fourthly, a specific example in which when the communication quality information is the throughput, the CQI, or the moving speed for each UE 100, and the statistics amount is a worst value will be described. In this case, the worst value of the moving speed is a highest moving speed. When the statistics amount is the worst value, it is possible to apply a determination method similar to that for the above-described average value.

Fifthly, a specific example in which the communication quality information is the delay dispersion range and the statistics amount is the worst value will be described.

The delay dispersion range is a time range between a preceding wave and a delayed wave. Specifically, it is possible to regard a range from a mountain having largest power to a mountain having from the power to power within a predetermined range as the delay dispersion range. Alternately, it may be also possible to regard a range having a mountain having power equal to or more than a predetermined level as the delay dispersion range.

Further, the worst value of the delay dispersion range is the delay dispersion range in the UE 100 having a widest delay dispersion range.

FIG. 20 and FIG. 21 are diagrams showing one example of the worst value of the delay dispersion range, as the statistics amount.

As shown in FIG. 20(*a*), when the delay dispersion range is wide, as shown in FIG. 20(*b*), a variation in frequency characteristic is large, and thus, it is difficult to interpolate the channel estimation.

As shown in FIG. 21(*a*), when the delay dispersion range is narrow, as shown in FIG. 21(*b*), the variation in frequency characteristic is small, and thus, it is easy to interpolate the channel estimation.

Therefore, when the worst value of the delay dispersion range is greater than a threshold value, the processor 240 applies the reference signal pattern A having a high reference signal density in order to improve the communication environment (improve the channel estimation accuracy).

In contrast, when the worst value of the delay dispersion range is smaller than the threshold value, the processor 240 applies the reference signal pattern B having a low reference signal density in order to improve the throughput.

It is noted that when the communication quality information is the delay dispersion range, it is possible to appropriately adjust the channel estimation accuracy by changing the reference signal density in the frequency-axis direction rather than by changing the reference signal density in the time-axis direction.

(Conclusion of Embodiment)

In a mobile communication system in which a radio signal including a downlink reference signal for estimating a channel characteristic is transmitted and received, the eNB 200 communicates with the UE 100-1 to the UE 100-*n*. The eNB 200 includes the processor 240 that changes a reference signal density that is a density of a downlink reference signal applied to the communication with the UE 100-1 to the UE 100-*n*. The processor 240 calculates a statistics amount of communication quality information acquired for all the UE 100-1 to the UE 100-*n*, and changes the reference signal density on the basis of the statistics amount.

As a result, it is possible to dynamically change the reference signal density while statistically determining a communication environment of all the UEs 100 connected with the eNB 200, on the basis of a statistics amount of communication quality information.

In a mobile communication system in which a radio signal including a downlink reference signal for estimating a channel characteristic is transmitted and received, the UE 100 communicates with the eNB 200. The UE 100 includes: the memory 150 that stores a plurality of reference signal patterns each having a different downlink reference signal density; the radio transceiver 110 that receives, from the eNB 200, a radio signal including the downlink reference signal; and the processor 160 that determines the reference signal pattern applied to the received radio signal on the basis of a correlation value between the received radio signal and each of a plurality of reference signal patterns.

Here, when the density of the reference signal is dynamically changed, there is a problem that signaling for notifying such a change increases.

According to the UE 100 of the present embodiment, even when the reference signal pattern (that is, the density of the downlink reference signal) is changed, the UE 100 autonomously determines the changed reference signal pattern, and thus, it is possible to eliminate a need of signaling for notifying such a change. Therefore, it is possible to change the density of the downlink reference signal without increasing the signaling.

[Other Embodiments]

Thus, the present invention has been described with the embodiments. However, it should not be understood that those descriptions and drawings constituting apart of this disclosure limit the present invention. From this disclosure, a variety of alternate embodiments, examples, and applicable techniques will become apparent to one skilled in the art.

In the above-described embodiment, a case where the reference signal density (reference signal pattern) in the downlink reference signal (downlink reference signal) is dynamically changed is mainly described. However, the present invention can be applied to a case where in addition to the downlink reference signal, a reference signal density in an uplink reference signal (specifically, DMRS) is dynamically changed.

In the above-described embodiment, a case where the eNB 200 uses one carrier in the downlink is mainly described. However, when the eNB 200 uses a plurality of carriers in the downlink, the eNB 200 may calculate a statistics amount for each carrier and may change the reference signal density for each carrier.

In the above-described embodiment, the category of the base station of the eNB 200 is not mentioned; however, the eNB 200 may be a small cell base station configuring a small cell (for example, a pico cell or a femto cell) smaller than a micro cell. In this case, the UE 100-1 to the UE 100-n are connected with the small cell.

Generally, the number of UEs that can be housed in the small cell is smaller than that of UEs that can be housed in the micro cell. The eNB 200 calculates the statistics amount of the communication quality information acquired for all the UE 100-1 to the UE 100-n, and therefore, when a large number of UEs 100 are connected with the eNB 200, the statistics amount is leveled. Therefore, when the eNB 200 is the small cell base station, the number of UEs 100 that is to be statistically processed is small, and therefore, it is possible to avoid such a problem.

The above-described embodiment has described an example in which the present invention is applied to an LTE system. However, the present invention may also be applied to systems, other than the LTE system, as well as the LTE system.

In addition, the entire content of U.S. Provisional Application No. 61/730,629 (filed on Nov. 28, 2012) and U.S. Provisional Application No. 61/730,635 (filed on Nov. 28, 2012) is incorporated in the present specification by reference.

INDUSTRIAL APPLICABILITY

As described above, a base station, a processor therefor, a communication control method therefor, and a user terminal according to the present invention, are possible to appropriately control the density of a reference signal, and thus are useful in a mobile communication field.

The invention claimed is:

1. A base station that communicates with a plurality of user terminals in a mobile communication system, comprising:
a transmitter configured to transmit a radio signal including reference signals for estimating a channel characteristic, to the plurality of user terminals, by using a plurality of subframes each including a control region for conveyance of control signals and a data region for conveyance of data; and
a controller configured to change a reference signal density that is a density of the reference signals to be transmitted to the plurality of user terminals, wherein
the controller calculates a statistics amount of communication quality information acquired for all the plurality of user terminals,
the controller changes, on the basis of the statistics amount, the reference signal density by changing at least one of a first reference signal density that is a density of the reference signals in the control region and a second reference signal density that is a density of the reference signals in the data region, wherein the first reference signal density and the second reference signal density are individually changed, and
the controller excludes a user terminal out of the plurality of user terminals, from a target for calculating the statistics amount, wherein the excluded user terminal is a user terminal in which the degree of a variation of the corresponding communication quality information is greater than a threshold value or a user terminal in which a data amount corresponding to an application to be executed is smaller than a threshold value.

2. The base station according to claim 1, wherein the reference signals are downlink reference signals commonly applied to the plurality of user terminals.

3. The base station according to claim 1, wherein the communication quality information is at least one of: throughput for each of the plurality of user terminals; CQI for each of the plurality of user terminals; a moving speed for each of the plurality of user terminals; and a delay dispersion range for each of the plurality of user terminals.

4. The base station according to claim 1, wherein the statistics amount is an average of the communication quality information, a worst value of the communication quality information, or a cumulative distribution function of the communication quality information.

5. The base station according to claim 1, wherein the controller changes, when a predetermined reference signal density is used for the communication with the plurality of user terminals, the reference signal density to a reference signal density that is lower than the predetermined reference signal density, in response to improvement on the statistics amount.

6. The base station according to claim 1, wherein the controller changes, when a predetermined reference signal density is used for the communication with the plurality of user terminals, the reference signal density to a reference signal density that is higher than the predetermined reference signal density, in response to deterioration of the statistics amount.

7. The base station according to claim 1, wherein the base station configures a cell smaller than a macro cell, and
the plurality of user terminals are connected with the cell.

8. The base station according to claim 1, wherein the controller decreases the first reference signal density while maintaining the second reference signal density.

9. The base station according to claim 1, wherein the controller decreases density of the reference signals in a first part of the data region while maintaining the first reference signal density and maintaining a density of the reference signals in a part of the data region other than the first part of the data region.

10. A processor provided in a base station that communicates with a plurality of user terminals in a mobile communication system, the processor comprising a chipset communicatively coupled to a memory, wherein
the processor performs processes of:
transmitting a radio signal including reference signals for estimating a channel characteristic, to the plurality of user terminals, by using a plurality of subframes each including a control region for conveyance of control signals and a data region for conveyance of data; and changing a reference signal density that is a density of the reference signals to be transmitted to the plurality of user terminals, wherein
in changing the reference signal density, the processor further performs processes of:
calculating a statistics amount of communication quality information acquired for all the plurality of user terminals, and
changing, on the basis of the statistics amount, the reference signal density by changing at least one of a first reference signal density that is a density of the reference signals in the control region and a second reference signal density that is a density of the reference signals in the data region, wherein the first reference signal density and the second reference signal density are individually changed, wherein
the processor further performs a process of excluding a user terminal out of the plurality of user terminals, from a target for calculating the statistics amount, wherein the excluded user terminal is a user terminal in which the degree of a variation of the corresponding communication quality information is greater than a threshold value or a user terminal in which a data amount corresponding to an application to be executed is smaller than a threshold value.

11. A communication control method used in a mobile communication system, comprising:
transmitting by a base station, a radio signal including reference signals for estimating a channel characteristic, to a plurality of user terminals, by using a plurality of subframes each including a control region for conveyance of control signals and a data region for conveyance of data; and
changing by the base station, a reference signal density that is a density of the reference signals to be transmitted to the plurality of user terminals, wherein
changing the reference signal density further comprises:
calculating, by the base station, a statistics amount of communication quality information acquired for all the plurality of user terminals, and
changing, by the base station, on the basis of the statistic amount, the reference signal density by changing at least one of a first reference signal density that is a density of the reference signals in the control region and a second reference signal density that is a density of the reference signals in the data region, wherein the first reference signal density and the second reference signal density are individually changed, wherein
the communication control method further comprises excluding, by the base station, a user terminal out of the plurality of user terminals, from a target for calculating the statistics amount, wherein the excluded user terminal is a user terminal in which the degree of a variation of the corresponding communication quality information is greater than a threshold value or a user terminal in which a data amount corresponding to an application to be executed is smaller than a threshold value.

12. A user terminal that communicates with a base station in a mobile communication system, wherein the base station transmits a radio signal including reference signals for estimating a channel characteristic, to user terminals, by using a plurality of subframes each including a control region for conveyance of control signals and a data region for conveyance of data, the user terminal comprising:
a storage configured to store a plurality of reference signal patterns each having a different reference signal density different in that the reference signal density is changed by changing at least one of a first reference signal density that is a density of the reference signals in the control region and a second reference signal density that is a density of the reference signals in the data region, wherein the first reference signal density and the second reference signal density are individually changed;
a receiver configured to receive the radio signal including the reference signals, from the base station; and
a controller configured to determine a reference signal pattern applied to the received radio signal on the basis of a correlation value between the received radio signal and each of the plurality of reference signal patterns, wherein
the controller determines the reference signal pattern only when a difference between the correlation values calculated for each of the plurality of reference signal patterns is greater than a threshold value.

13. The user terminal according to claim 12, wherein the reference signals are downlink reference signals commonly applied to a plurality of user terminals that communicate with the base station.

14. The user terminal according to claim 12, wherein the controller determines a reference signal pattern having a highest correlation value with the received radio signal, out of the plurality of reference signal patterns, as a reference signal pattern applied to the received radio signal.

15. The user terminal according to claim 12, wherein when the base station changes the reference signal pattern at a predetermined timing, the controller determines the reference signal pattern in accordance with the predetermined timing.

16. The user terminal according to claim 12, wherein the plurality of reference signal patterns include:
a first reference signal pattern having a predetermined reference signal density in a frequency-axis direction; and
a second reference signal pattern having a reference signal density lower than the predetermined reference signal density in a frequency-axis direction.

17. The user terminal according to claim 16, wherein the first reference signal pattern is a pattern in which the reference signals are arranged in all resource blocks in the frequency-axis direction, and
the second reference signal pattern is a pattern in which the reference signals are arranged in only some resource blocks in the frequency-axis direction.

18. The user terminal according to claim 12, wherein the plurality of reference signal patterns include:
a first reference signal pattern having a predetermined reference signal density in a time-axis direction; and
a second reference signal pattern having a reference signal density lower than the predetermined reference signal density in the time-axis direction.

19. The user terminal according to claim 18, wherein the first reference signal pattern is a pattern in which the reference signals are arranged evenly in all subframes in a time-axis direction, and
the second reference signal pattern is a pattern in which the reference signals are arranged evenly in some subframes in the time-axis direction, and the reference signals are partially arranged in the remaining subframes.

20. The user terminal according to claim 12, wherein the controller increases, upon determining that the channel characteristic is changed slightly, a priority of a reference signal pattern determined last time, and determines the reference signal pattern this time.

21. The user terminal according to claim 12, wherein the storage stores a reference signal pattern in which the first reference signal density is decreased while the second reference signal density are maintained.

22. The user terminal according to claim 12, wherein the storage stores a reference signal pattern in which density of the reference signals in a first part of the data region is decreased while the first reference signal density and a density of the reference signals in a part of the data region other than the first part of the data region are maintained.

23. A processor provided in a user terminal that communicates with a base station in a mobile communication system, wherein the base station transmits a radio signal including reference signals for estimating a channel characteristic, to user terminals, by using a plurality of subframes each including a control region for conveyance of control signals and a data region for conveyance of data, the processor comprising a chipset communicatively coupled to a memory, wherein the processor performs processes of:
storing a plurality of reference signal patterns each having a different reference signal density different in that the reference signal density is changed by changing at least one of a first reference signal density that is a density of the reference signals in the control region and a second reference signal density that is a density of the reference signals in the data region, wherein the first reference signal density and the second reference signal density are individually changed;
receiving the radio signal including the reference signals, from the base station; and
determining a reference signal pattern applied to the received radio signal on the basis of a correlation value between the received radio signal and each of the plurality of reference signal patterns, wherein
in determining the reference signal pattern, the processor further performs the process of determining the reference signal pattern only when a difference between the correlation values calculated for each of the plurality of reference signal patterns is greater than a threshold value.

24. A communication control method used for a user terminal that communicates with a base station in a mobile communication system, wherein the base station transmits a radio signal including reference signals for estimating a channel characteristic, to user terminals, by using a plurality of subframes each including a control region for conveyance of control signals and a data region for conveyance of data, the method comprising:

storing a plurality of reference signal patterns each having a different reference signal density different in that the reference signal density is changed by changing at least one of a first reference signal density that is a density of the reference signals in the control region and a second reference signal density that is a density of the reference signals in the data region, wherein the first reference signal density and the second reference signal density are individually changed;
receiving the radio signal including the reference signals, from the base station; and
determining a reference signal pattern applied to the received radio signal on the basis of a correlation value between the received radio signal and each of the plurality of reference signal patterns, wherein
determining the reference signal pattern further comprises determining the reference signal pattern only when a difference between the correlation values calculated for each of the plurality of reference signal patterns is greater than a threshold value.

* * * * *